Jan. 27, 1953 E. R. PRICE 2,626,691
POWER PLANT CONTROL MECHANISM
Filed Sept. 19, 1946 7 Sheets-Sheet 2

INVENTOR
EARL R. PRICE.
BY H. O. Clayton
ATTORNEY.

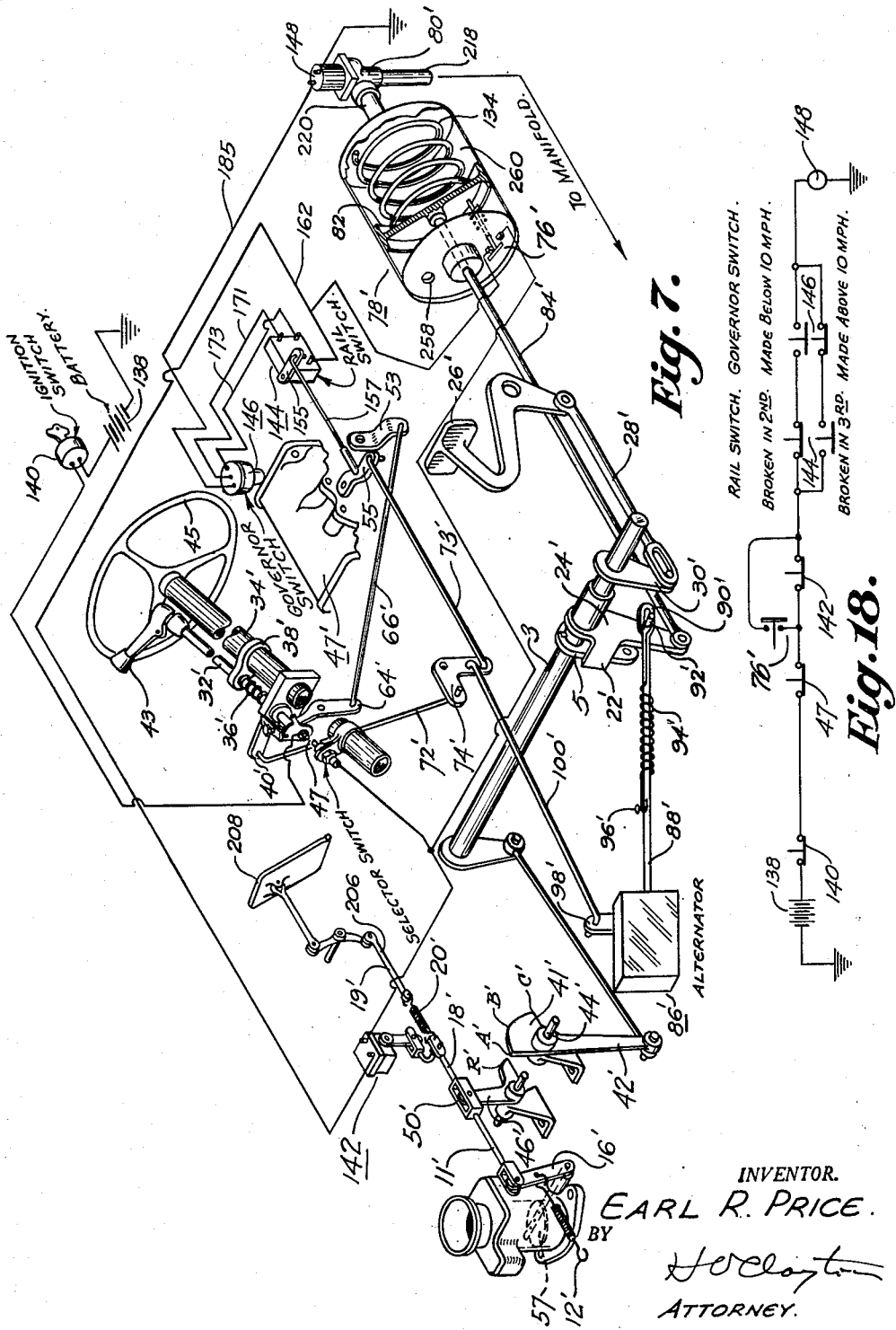

Jan. 27, 1953     E. R. PRICE     2,626,691
POWER PLANT CONTROL MECHANISM
Filed Sept. 19, 1946     7 Sheets-Sheet 4

Inventor

EARL R. PRICE.

Attorney

Jan. 27, 1953 — E. R. PRICE — 2,626,691
POWER PLANT CONTROL MECHANISM
Filed Sept. 19, 1946 — 7 Sheets-Sheet 5

INVENTOR.
EARL R. PRICE.
BY H. C. Clayton
ATTORNEY.

Inventor
EARL R. PRICE.

Jan. 27, 1953  E. R. PRICE  2,626,691
POWER PLANT CONTROL MECHANISM
Filed Sept. 19, 1946  7 Sheets-Sheet 7

Inventor
EARL R. PRICE.
By H. O. Clayton

Patented Jan. 27, 1953

2,626,691

UNITED STATES PATENT OFFICE 2,626,691

POWER PLANT CONTROL MECHANISM

Earl R. Price, South Bend, Ind., assignor to Bendix Aviation Corporation, South Bend, Ind., a corporation of Delaware Application September 19, 1946, Serial No. 697,877

10 Claims. (Cl. 192—.073)

This invention relates in general to power and manually operated means for controlling the operation of the friction clutch, the change speed transmission, and the throttle of an automotive vehicle and in particular to means for effecting the desired synchronization of said controls in the operation of the power plant of said vehicle.

Yet another object of my invention is to provide, in the power plant of an automotive vehicle, means for interconnecting the accelerator, the clutch, the throttle and a clutch and transmission operating motor said means serving to hold the throttle closed as the motor is operative to disengage the clutch and also serving to insure a synchronized engagement of the clutch and opening of the throttle after the motor is de-energized to permit a re-engagement of the clutch.

A further object of my invention is to provide power means for controlling the operation of the throttle and friction clutch of an automotive vehicle said means being also adapted for use as a power means for operating the change speed transmission of said vehicle.

A further object of my invention is to provide a stage type of power means for operating the friction clutch of an automotive vehicle said means serving to control the operation of the throttle of said vehicle by insuring a closing of the throttle as the clutch is being disengaged and also serving to effect a synchronized engagement of the clutch and opening of the throttle as the clutch is being engaged.

Yet another object of my invention is to provide, in the power plant of an automotive vehicle, a stage type of power means for operating the friction clutch of said power plant, said power means also serving to so control the opening of the engine throttle of said power plant that said opening effects, in cooperation with the engagement of the clutch, the desired acceleration of the vehicle.

Yet another object of my invention is to provide, in the power plant of an automotive vehicle including an engine throttle, a clutch and a change-speed transmission, means, including a single acting pressure differential motor, for operating the transmission and for operating the throttle and clutch to facilitate an operation of the transmission, said means also including a two part stop means which serves to maintain the throttle closed as the clutch is being disengaged in preparation for an operation of the transmission said two part stop means also serving to effect a synchronized opening of the throttle and engagement of the clutch.

The most important object of my invention, however, is to improve the mechanism disclosed in my U. S. application for patent No. 642,240, filed January 19, 1946, by providing in the power plant of an automotive vehicle including a throttle valve, a friction clutch and a three speeds forward and reverse transmission, manually and power operated means for operating the transmission and for synchronizing the operation of the throttle with respect to the operation of the clutch, said means including a single acting motor operable in one cycle of operations to successively disengage the clutch, operate the transmission and then re-engage the clutch. In effecting these operations the motor may serve to control a cam which serves to control the operation of the motor and said motor also controls another cam which serves both as a stop means to prevent an undesired opening of the throttle as the clutch is being disengaged and as a stop means to control the opening of the throttle as the clutch is being engaged.

Other objects of the invention and desirable details of construction and combination of parts will become apparent from the following descriptions of preferred embodiments of my invention, which descriptions are taken in conjunction with the accompanying drawings, in which:

Figure 7 is a diagrammatic view disclosing another embodiment of my invention;

Figure 18 is a wiring diagram of the electrical mechanism disclosed in Figure 7.

Figure 1:
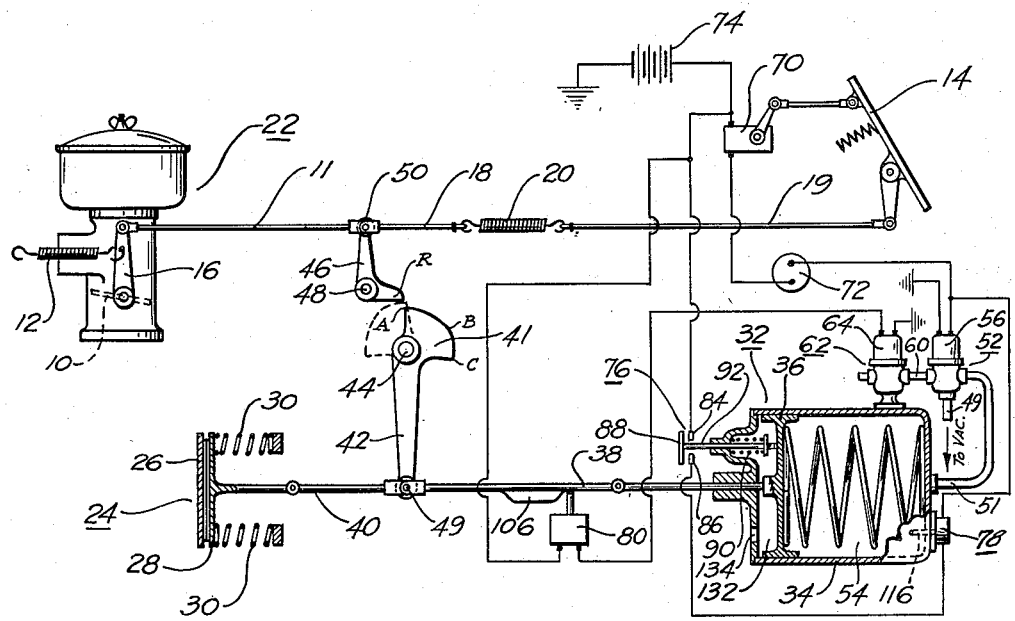
Figure 1 is a diagrammatic view disclosing the principal features of one embodiment of the clutch and throttle operating means constituting my invention.

Referring now to Figure 1, disclosing one embodiment of my invention, a throttle valve 10, which is rotated to its closed position by a spring 12, is operatively connected to the accelerator 14 of an automotive vehicle by means of force transmitting means including a crank 16, a link 18, a link 11, a link 19 connected to the accelerator, and a spring 20 the latter interconnecting the links 18 and 19. The throttle valve 10 constitutes a part of a standard type of automotive carburetor 22.

My invention includes a friction clutch operating means operable to control the operation of the aforementioned throttle operating force transmitting means. The friction clutch 24 to be operated is diagrammatically disclosed in Figure 1 and includes a driving plate 26 and a driven plate 28 said plates being forced into driving contact with each other by spring means 30; and said clutch is disengaged by a pressure differential operated motor 32 including a cylinder 34 and a piston 36 the latter being connected to the driven clutch plate 28 by means of links 38 and 40.

One of the most important features of my invention lies in the connection between the motor piston 36 and the aforementioned throttle operating force transmitting linkage; and said connection preferably includes a lever 42, pivotally mounted upon a fixed pivot 44, and a bell crank lever 46 pivotally mounted upon a fixed pivot 48. The lower arm of the lever 42 is pivotally connected at 49 to ends of the links 38 and 40 and the upper arm of lever 46 is pivotally connected at 50 to the links 18 and 11. One of the principal features of this two part connecting means lies in the outline of the upper arm 41 of the lever 42; for said upper arm is shaped to provide stop means operative as a cam to control the mode of opening of the throttle during the engagement of the clutch; and said arm is also shaped and so cooperates with the throttle operating linkage and the lever 46 connected thereto, as to prevent an opening of the throttle as the clutch is being disengaged. It follows therefore that levers 42 and 46 cooperate to provide a stop means for controlling the operation of the throttle.

Figure 3:
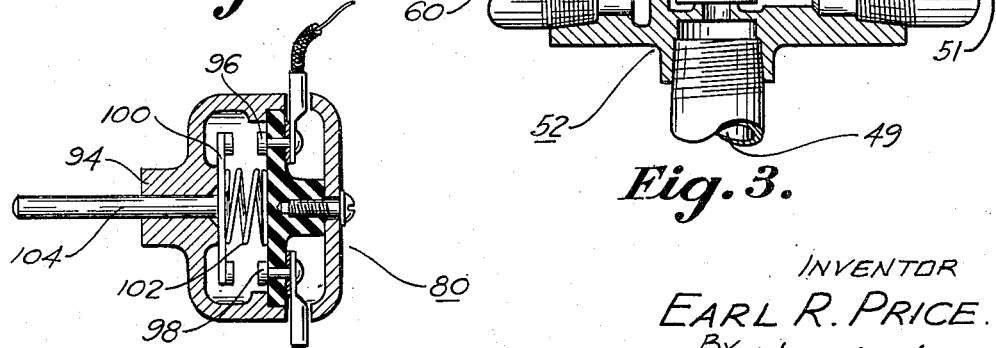
Figure 3 is a sectional view of the solenoid operated three way valve unit constituting one of the controls for the pressure differential operated motor disclosed in Figure 1.

Describing the means for controlling the operation of the motor 32 said means includes a three way valve 52, Figures 1 and 3, operative to connect a control compartment 54 of said motor either with a source of vacuum, preferably the intake manifold of the engine of the vehicle, or with the atmosphere. The valve 52 is actuated to energize the motor 32 by means of a solenoid 56 and said valve is actuated to de-energize said motor by means of a spring 58. When the solenoid 56 is energized the valve 52 is operated to interconnect the intake manifold of the engine with the compartment 54 via conduits 49 and 51 thereby effecting the energization of the motor; and when the solenoid is de-energized the spring 58 functions to operate said valve to vent said compartment to the atmosphere via a conduit 60 and the conduit 51 thereby effecting a de-energization of the motor. As is disclosed in Figure 4 the air flowing into the conduit 60 is controlled by a choke valve 62 said valve being actuated, when a grounded solenoid 64 is energized, to move a cone-shaped portion 65 of the valve upwardly to reduce the cross-sectional area of the vent passage connected with the conduit 60; and said cone-shaped portion 65 is actuated by a spring 66, when the solenoid 64 is de-energized, to increase the cross-sectional area of said passage. When the latter operation is effected the flow of air into the compartment 54 is unrestricted.

Describing now the electrical means for controlling the operation of the solenoids 56 and 64 the solenoid 56, which is grounded, is in part preferably controlled by an accelerator operated breaker switch 70 and a vehicle speed responsive governor operated breaker switch 72 said solenoid and switches being electrically connected in series with a grounded battery 74; and as is disclosed in Figure 1 the operation of the solenoid 56 is also controlled by switches 76 and 78 which are operated by the piston 36 of the motor 32 said switches being electrically connected in series in an electrical circuit which is in parallel with the aforementioned accelerator operated switch 70 and governor operated switch 72. As to the electrical means for controlling the choke valve operating solenoid 64 this control means is controlled by a piston operated breaker switch 80 disclosed in detail in Figure 6. The piston operated switch 76 which is diagrammatically disclosed in detail in Figure 1 includes a casing, not shown, mounted on the cylinder 34 said casing housing fixed switch contacts 84 and 86 and a movable switch contact 88 biased into engagement with the fixed contacts by a spring 90. The movable contact includes a pin 92 slidably through the end wall of the cylinder said pin being contacted by the piston 36 to open the switch when said piston reaches its clutch engaged position, that is its position in the left end of the cylinder 34.

Figure 6:
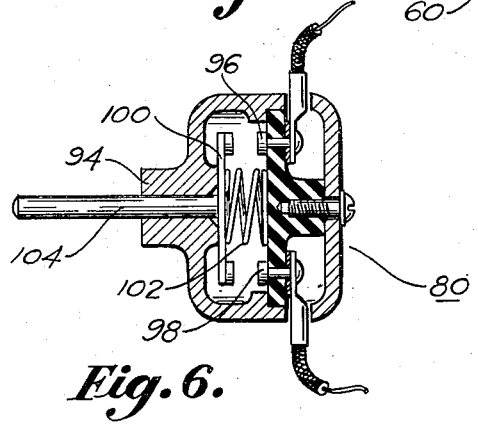
Figure 6 is a sectional view disclosing details of another of the motor piston operated breaker switches of the mechanism of Figure 1 of my invention.

Describing the piston operated breaker switch 80 disclosed in detail in Figure 6, this switch includes a casing 94 housing fixed contacts 96 and 98 and a movable contact 100 biased to its switch off position by a spring 102. To the movable contact 100 there is secured a pin 104 contacted by a cam member 106, Figure 1, secured to the rod 38.

The piston operated breaker switch 78 includes fixed contacts 108 and 110 and a movable contact 112 said contacts being suitably housed within a casing 114 conveniently mounted upon the cylinder 34. To the movable contact 112 there is secured a stem 116 which is slidably mounted in an end wall of the cylinder 34; and a spring 118 interposed between the inner face of one of the ends of the casing 114 and a guide member 122 secured to the end of the stem 116, serves to bias the movable contact member 112 into engagement with the fixed contact members 108 and 110 to close the switch.

The governor operated breaker switch 72 and the accelerator operated breaker switch 70 are of standard construction accordingly the same are not disclosed in detail.

Describing now the complete operation of the above described mechanism it will be assumed that the car is at a standstill with the accelerator released and the engine dead. This being the case the pressure differential operator motor 32 will be de-energized and the piston 36 and other parts of the previously described mechanism will take positions disclosed in Figure 1. If the engine is now cranked, the accelerator remaining released to keep the throttle closed, there will be developed, by virtue of the pumping operation of the engine pistons, a partial evacuation of the intake manifold of said engine; and this evacuated condition of the manifold will result in an energization of the motor 32 to move the piston 36 to the right end of the cylinder, Figure 1, thereby effecting a disengagement of the clutch. The valve 52 is at this time open to make this operation of the motor possible inasmuch as the accelerator and governor operated switches 70 and 72 are at this time closed to effect an energization of the solenoid 56. The governor operated switch is preferably closed at a relatively low car speed say, 8 M. P. H.; and said switch is open when the car is traveling above this speed.

Explaining in greater detail this clutch disengaging operation of the piston 36 the piston is, by virtue of admission of air to a compartment 132 of the motor via an opening 134 and by virtue of the above described partial evacuation of the compartment 54, subjected to a differential of pressures to move the same to the right, Figure 1; and this movement of the piston results in a rotation of the lever 42 to move the cam portion 41 of said lever to the position shown in dotted lines in Figure 1.

The driver will then probably place the transmission in its low gear setting whereupon he will depress the accelerator to open the throttle 10 and the switch 70. The throttle, however, will remain in its closed, that is throttle idle position, during the aforementioned movement of the piston 36 to disengage the clutch; for the toe end portion CB of the cam 41 will then act as a stop to prevent a clockwise rotation of the lever 46 or its equivalent stop means. It is apparent, therefore, that if the accelerator is depressed as the piston 36 is moving to disengage the clutch that the spring 20 will be expanded. Maintaining the throttle at its idle setting during the clutch disengaging operation of the motor 32 serves to insure sufficient vacuum to effect said operation; for if the throttle were opened during this operation such action would substantially lower the vacuum of the intake manifold thereby making it impossible to complete the clutch disengaging operation of said motor.

In this clutch disengaging operation of the motor 32 the switches 76 and 78 are closed, however, when the piston 36 reaches the end of its stroke it opens the switch 78 and with the accelerator at the time depressed to open the switch 70, this opening of the switch 78 results in a de-energization of the motor 32 to initiate its clutch engaging operation. In this operation the piston 36 moves to the left, Figure 1, to effect a clockwise rotation of the lever 42.

Now the periphery of the toe end portion CB of the cam 41 is so shaped and so cooperates with an end portion R of the lever 46, that there is no opening of the throttle possible until the point B is reached in this clutch engaging operation of the mechanism; and when the point B is opposite the end portion R then the clutch plates are preferably just slightly separated from each other. As the clutch plates move into engagement with each other there is of course a continued clockwise rotation of the stop member 42 and the cam 41 of said member is preferably shaped, from the point B to a point A thereon to make possible a progressive opening of the throttle 10 by the operation of the then expanded accelerator operated spring 20. When the clutch plates are fully engaged then the levers 42 and 46 and the piston 36 are in the positions disclosed in Figure 1; and it will be noted from inspection of Figure 1 that the lever 46 is then clear of the cam 41 making possible an uninterrupted throttle opening operation of the throttle operating linkage.

There is thus provided in the members 42 and 46 a cam mechanism serving to control the mode of opening of the throttle as the motor 32 is effecting its clutch engaging operation; for the face of the member 41 may be shaped to obtain the desired degree of throttle opening at any point of the stroke of the piston 36 as the clutch is being engaged. The member 41 is preferably shaped to maintain a relatively small opening or idling of the throttle as the piston moves from its clutch plate contact position to its extreme clutch disengaged position and, in the return operation, as said piston moves back from the latter position to said clutch plate contact position. As the piston continues its clutch engaging movement the throttle is progressively opened, by the operation of the spring 20, until the engine is rotating at say 1600 R. P. M. this engine speed being effected just as the engagement of the clutch is completed. Thereafter the cam 41 is clear of the lever 46 accordingly the driver may open the throttle as desired.

Figure 4:
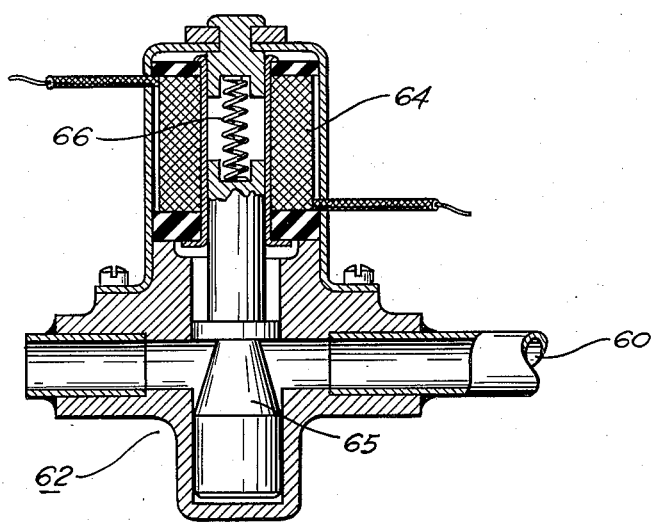
Figure 4 is a sectional view of the solenoid operated choke valve constituting another control for the pressure differential operated motor disclosed in Figure 1.
Figure 5:
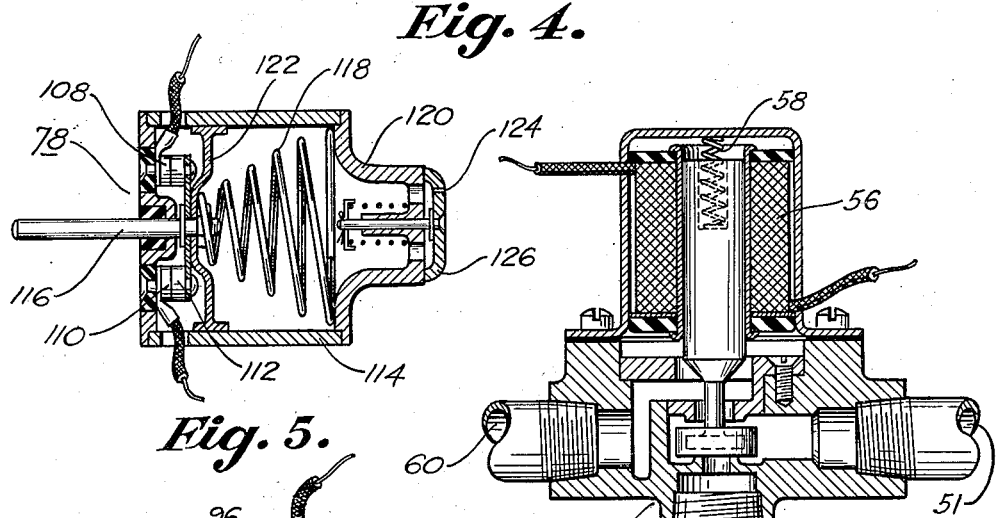
Figure 5 is a sectional view disclosing details of one of the three motor piston operated breaker switches of the mechanism of Figure 1 of my invention.

To facilitate the above described synchronized opening of the throttle and loading of the clutch plates it is desirable to impede the operation of the clutch springs as the clutch plate loading operation is being effected; and this is accomplished by the operation of the choke valve 62, Figure 4. As described above the solenoid 64 is energized to move the choke valve 62 upwardly, to restrict the flow of air into the compartment 54, when the piston 36 is operated to close the switch 80; and the latter operation is preferably effected during that portion of the stroke of the piston from a point when the clutch plates are just separated from each other up to and including a point just prior to a completion of a clutch engaging movement of said piston.

There is thus provided means which is operative, during a certain period of the clutch engaging movement of the piston 36, to cushion the engagement of the clutch, that is slow down the movement of the driving clutch plate 28 as it is being moved into contact with the driven clutch plate 26 and this fast, slow, fast movement of the piston provides a smooth engagement of the clutch as the throttle is being progressively opened.

Describing in greater detail one of the features of my invention during the clutch disengaging operation of the motor 32 the driver might carelessly depress the accelerator and thus open the switch 70 before said motor has completed its clutch disengaging operation; and to obviate this operation there is provided the above described switches 76 and 78 which are electrically connected in parallel with the switches 70 and 72. Now it is apparent from an inspection of Figure 1 that the first increment of clutch disengaging movement of the piston 36 will result in a closing of the switch 76 accordingly this operation completes an electrical circuit, via the then closed switch 78, to maintain the solenoid 56 energized despite an opening of the accelerator operated switch 70. When the piston is about to reach its clutch disengaged position it moves the pin 116 to open the switch 78 thereby automatically initiating a clutch engaging operation of the motor 32 assuming of course that either the accelerator has been depressed to open the switch 70 or the car is travelling above governor speed to open the switch 72. The closing of the switch 78 is, by virtue of the operation of a bleed opening 124, delayed until the clutch is again completely engaged. This bleed opening is provided in a check valve 126 and said valve is included in the switch mechanism 78 to insure the unimpeded switch opening movement of the guide 122. As described above the opening of the throttle is controlled by the cam 41 as the motor is effecting this clutch engaging operation.

There is thus provided manually and power operated means for controlling the operation of the throttle and clutch of an automotive vehicle the particular feature of my invention residing in the two part means, including the lever 46 and the cooperating cam 41, interconnecting the clutch operating motor and the throttle operating force transmitting means. With this mechanism an opening of the throttle is prevented once the clutch disengaging operation of said motor is initiated and the degree of opening of the throttle is controlled as said motor is operating to effect an engagement of the clutch.

Figure 2:
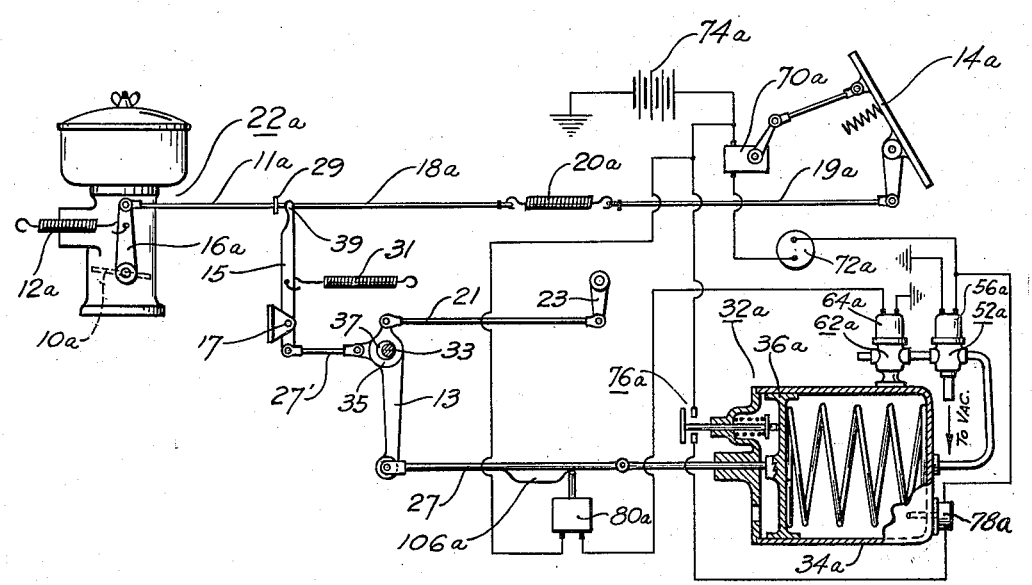
Figure 2 is a diagrammatic view disclosing the principal features of another embodiment of my invention.

There is disclosed in Figure 2 another embodiment of my invention in which the two part throttle controlling stop means includes a floating lever 13 and a lever 15 pivotally mounted upon a fixed pivot 17. The upper end of the lever 13 is pivotally connected, by a link 21, to a clutch operating crank 23; and the lower end of said lever 13 is pivotally connected to a motor piston 36ª by a link 27. As to the lever 15 this element is pivotally connected to the lever 13 by means of a link 27'; and the upper end of said lever 15 is biased out of contact with a stop 29 by means of a spring 31 which is weaker than the clutch springs, not shown. The spring 31 also serves to bias the lever 13 into contact with a fixed pin 33 said pin extending through a relatively large opening 37 in an enlarged portion 35 of said lever. The remainder of the parts of the mechanism of Figure 2 duplicates the same parts in the modification of my invention disclosed in Figure 1 accordingly said parts are given the same reference numeral as the like parts in Figure 1 with the addition however of a letter a.

Describing now the operation of the mechanism disclosed in Figure 2 it will be assumed that the engine is dead and the accelerator is released; and this being true the parts assume the position disclosed in said figure that is the position with the clutches engaged the piston 36ª being positioned in the left end portion of the cylinder 34ª. Then when the motor 32ª is energized to disengage the clutch the piston 36ª moves to the right the first increment of its movement serving to rotate the lever 15 about the pivot 17 the left side of the opening 37 moving into abutment wtih the pin 33; and this operation serves to rotate the lever 15 counter-clockwise about its pivot 17 until an end portion 39 contacts the stop 29. Continued clutch disengaging movement of the piston results in a rotation of the crank 23 to disengage the clutch the lever 13 pivoting about the pin 33; and during this movement of the piston the lever 15 serves as a stop to prevent an opening of the throttle. If the accelerator is depressed during the latter operation all that results is an elongation of the spring 20ª. As to the means for controlling the operation of the motor 32ª, including the switches 70ª, 72ª, 76ª and 78ª and the valves 52ª and 62ª, said control means duplicates the control means disclosed in Figure 1 accordingly a description of the operation of said control means is not repeated here.

There is thus provided, by the mechanism disclosed in Figure 2, power means for disengaging the clutch said means being so connected to the throttle operating means as to make possible a controlled opening of the throttle as the clutch is being engaged and to prevent an opening of the throttle as the clutch is being disengaged.

There is disclosed, in Figures 7 to 18 inclusive, a preferred embodiment of my invention the throttle, clutch and transmission controlling mechanism of this embodiment constituting an improvement upon the mechanism disclosed in my U. S. application for Patent No. 642,240, filed January 19, 1946.

Referring to Figure 7 of the drawings diagrammatically disclosing the improvement, a three speeds forward and reverse transmission 47' of conventional design is operated by means of a manually operated crank 53 and a manually and power operated crank 55, the crank 53 serving to operate the shift rail selecting mechanism of the transmission and the crank 55 serving to operate that part of the transmission functioning to move the selected rail to establish the transmission in the desired gear ratio. With such a transmission the crank 55 must be moved to its transmission neutral position to neutralize the transmission before the shift rail selecting crank 53 may be operated.

The mechanism disclosed in Figure 7 has to do with the manually and power operated means for actuating the aforementioned transmission operating cranks 53 and 55; for operating the engine throttle 57, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings.

A feature of the mechanism of Figure 7 lies in the combination of a fluid coupling, such e. g. as that which was incorporated in several 1941 and 1942 passenger vehicles, with the aforementioned mechanism which operates the aforementioned transmission, throttle and friction clutch; and said coupling, which is preferably incorporated in the power plant between the engine and the friction clutch, includes, of course, an impeller and a vaned rotor, the latter serving to drive the aforementioned driving plate of the clutch.

The friction clutch is operably connected to a clutch throw out shaft 3 to which is keyed a crank member 5 contactable by a flange member 22' extending laterally from a crank member 24' rotatably mounted on the shaft 3. The conventional manually operated clutch pedal 26' of the car is operably connected, by a link 28', to a crank 30' which is drivably connected to the shaft 3. As is disclosed in Figure 7 the connection between the crank 30' and link 28' is of the lost motion type to obviate a movement of the clutch pedal when the clutch is power operated by the mechanism described hereinafter.

Describing now one of the features of the mechanism disclosed in Figure 7, the same lies in the manually and power operated mechanism for operating the clutch operating shaft 3, the transmission operating cranks 53 and 55 and the throttle operating and controlling mechanism, all of said mechanism being disclosed in Figure 7. The shift rail operating cranks 53 and 55 are actuated by force transmitting means including a rotatable and bodily movable shaft 32' extending alongside the steering column 34' of the vehicle. As is disclosed in Figures 7, 15 and 16, the shaft 32' is biased downwardly by a spring 36' positioned between a stop 38' mounted on the steering column and a crank member 40' which is operably connected to said shaft by means of a clutch mechanism 42' described hereinafter. A shift lever 43 mounted beneath the steering wheel 45 is so connected to the shaft 32' that a rotation of said lever in a plane parallel to said wheel effects a rotation of said shaft about its longitudinal axis in the operation of either neutralizing the transmission or establishing the same in a gear setting; and this connection between the shift lever and shaft 32' is also such that the so-called cross-shift movement of the shift lever, that is the movement in a plane perpendicular to the plane of the steering column, results in a movement of the shaft 32' to either effect a shift rail selecting operation of the crank 53 or effect a declutching operation of the clutch 42' and a closing of a selector switch 47 to prepare the mechanism for its power operation.

Describing the aforementioned clutch mechanism 42', the said mechanism includes a member 44' sleeved over the lower end of the shaft 32', said member being permanently secured as by brazing to the crank 40'. The lower end portion of the member 44' is provided with a flange 46' which is recessed at 48', Figure 15, to provide a keyway for a key portion 50' of a spool shaped end portion of a clutch member 52', said member being sleeved over and drivably connected by splines 54' to the end portion 56' of the shaft 32'. A nut 58', threaded on the end of the shaft portion 56', serves as a stop for the clutch mechanism which is biased downwardly by the operation of the spring 36'.

The upper arm 60' of a bell crank lever 62' fits within the spool shaped portion of the clutch member 52' and the lower arm 64' of said lever is pivotally connected, by a link 66', to the shift rail selecting crank 53. As is disclosed in Figure 16, the spring 36' serves to bias the clutch 42' and shaft 32' as a unit downwardly, the movement being limited by a stop 68', Figure 16, constituting a part of a steering column mounted bracket member 70'; and in this position of the clutch 42' the shift rail selector crank 53 is actuated to prepare the transmission for either a second gear or high gear operation, said operation of course depending upon the subsequent actuation of the shift rail operating crank 55. To actuate the crank 53 to prepare the transmission for either a low gear or reverse gear operation, that is a selection of the low and reverse gear shift rail of the transmission, the driver lifts the shift lever 43 upwardly in a plane perpendicular to the plane of the steering wheel; and this operation serves to rotate the bell crank lever 62' in a counter-clockwise direction, Figure 15, the spring 36' being compressed and the flange 46', Figure 16, being moved into engagement with the stop 68'. To actuate the shift rail operating crank 55 to neutralize the transmission or establish the same in any one of its four gear ratio settings, the driver rotates the shift lever 43 in a plane parallel to the plane of the steering wheel thereby effecting an angular movement of the crank 40' which is preferably connected to the crank 55 by force transmitting means including link 72', a bell crank lever 74' and a link 73'.

There is thus provided, by the above described mechanism, means for manually operating a three speeds forward and reverse transmission; and in this manual operation of the transmission the shift lever 43 is movable to six different positions, said selective movement outlining the letter H.

An important feature of the mechanism of Figure 7 lies in the power means for operating the transmission and clutch and for controlling the operation of the throttle; and said means is diagrammatically disclosed in said figure. The principal element of this power means consists of a single acting fluid pressure motor 78' operably connected to the clutch throw out shaft 18' and to the shift rail operating crank 55; and said motor is controlled by a standard type of solenoid operated three way valve 80', no claim to which is made.

Describing now the details of the aforementioned power means, the power element 82 of the motor 78' is connected to the crank 24' by a link 84'; and said crank is yieldingly connected to a so-called alternator 86' by means, preferably including a pin 92' extending from the crank. One end of a spring 94', preferably coiled around the link 88', is connected to a pin 96' secured to said link; and the other end of said spring is fastened to the pin 92'. A crank 98' of the alternator mechanism 86' is pivotally connected to the bell crank lever 74' by a link 100'.

Figure 14:
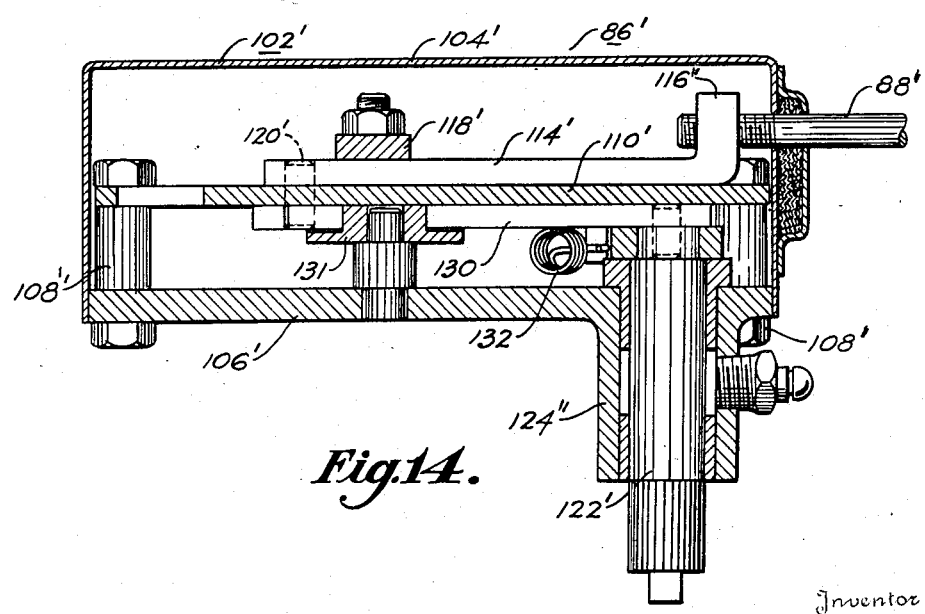
Figure 14 is a sectional view of the alternator unit said view being taken on the line 14—14 of Figure 13.

Describing now the details of the alternator 86', that is the direction changing mechanism of my invention, the same includes a casing 102', Figure 14, of two parts 104' and 106'. To the casing part 106' there is detachably secured by bolts 108' a plate 110' having a V-shaped guide slot 112' therein, and a thrust member 114' adjustably secured at 116' to the link 88' and positioned between a strap 118' and the outer face of the plate 110' is provided with a laterally extending pin 120' which extends through the aforementioned V-shaped slot. To the outer end of a rotatable shaft 122' journalled in a boss 124' extending from the casing part 106' there is drivably connected the aforementioned crank 98', Figure 7; and to the inner end of the shaft 122' there is drivably connected a bell crank lever 126'. To one end of the latter lever there is pivotally connected a thrust link 128 which is recessed at its outer end to receive the pin 120'; and to the other end of the lever 126' there is pivotally connected another thrust link 130 which is also recessed at its outer end to receive the pin 120'; and the two thrust links are biased towards each other into contact with a guide roller 131 by a spring 132 connected to both of said links.

Figure 13:
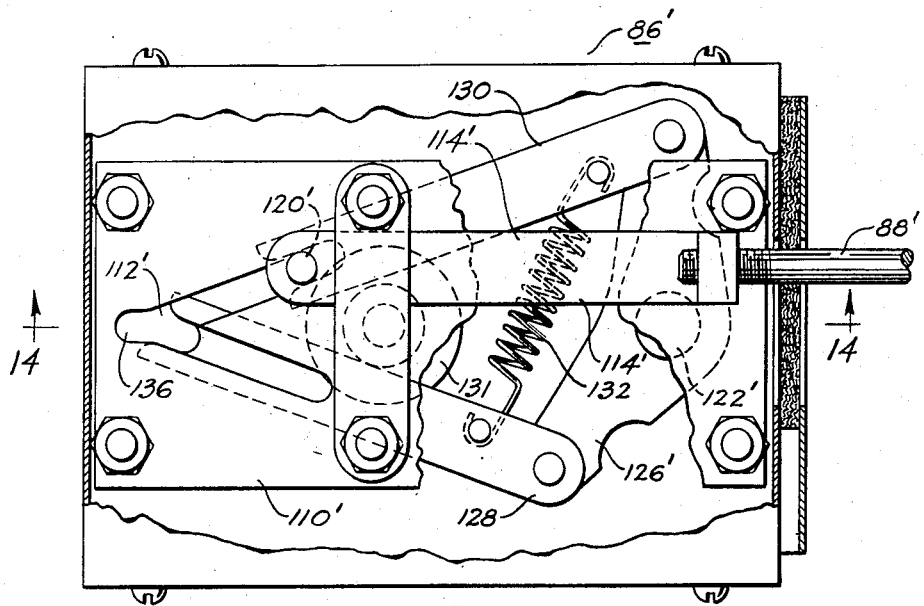
Figure 13 is a view disclosing details of the alternator unit of Figure 7.

Describing the operation of the above described alternator 86', when the fluid pressure motor 78' is de-energized a return spring 134 therein together with the clutch springs, serve to move the link 88' and thrust member 114' connected thereto to the left, Figure 13, to position the pin 120' within a recess 136 constituting the apex of the aforementioned V-shaped guide slot 112'; then when the motor 78' is energized to effect an operation of the transmission and clutch the pin 120', after moving a relatively short distance, rests within the recessed end of one or the other of the thrust links 128 and 130, depending upon whether the transmission is at the time established in second gear or in high gear. Continued movement of the thrust member 114' then results in a rotation of the lever 126' to rotate the crank 98' to establish the transmission in its new setting; and as will be noted from an inspection of Figure 13 this operation of the lever 98' serves to move the then inoperative thrust link into position preparatory for its operation to rotate the lever 126'.

There is thus provided a so-called alternator or direction changing means whereby the transmission operating angular movement of the crank 55 is alternately reversed with each successive energization of the single-acting motor 78'.

As to the means for controlling the operation of the motor 78', said means includes the electrical mechanism disclosed in Figures 7 and 18; and this mechanism comprises a grounded battery 138, the ignition switch 140 of the car, the aforementioned shift lever operated selector switch 47, an accelerator operated breaker switch 142 which is closed when the accelerator is released, a shift rail operated switch mechanism 144, a vehicle speed responsive governor operated switch mechanism 146 and a grounded solenoid 148 which operates the motor controlling three way valve 80'. The aforementioned switch mechanisms are electrically interconnected as disclosed in Figure 18, and of said mechanisms the accelerator operated switch 142 is of a conventional breaker switch construction accordingly the same is not disclosed in detail.

Figure 8:
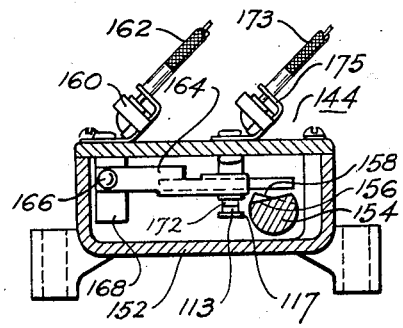
Figure 8 is a sectional view disclosing details of the transmission operated cut out switch disclosed in Figure 7 said view being taken on the line 8—8 of Figure 9.
Figure 9:
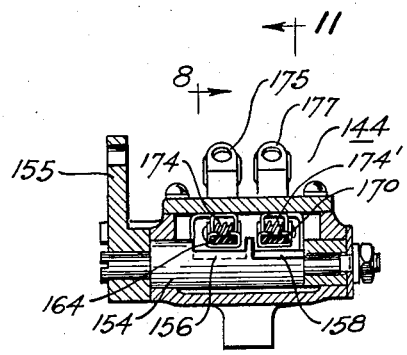
Figure 9 is a sectional view of the transmission operated cut out switch disclosed in Figure 7.
Figure 11:
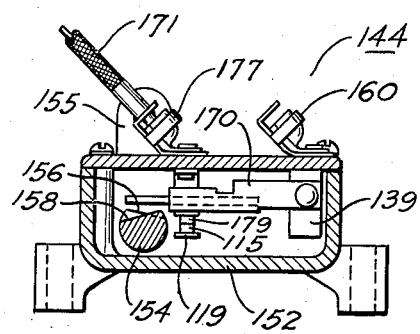
Figure 11 is an other sectional view of the transmission operated switch mechanism disclosed in Figure 7 said view being taken on line 11—11 of Figure 9.
Figure 12:
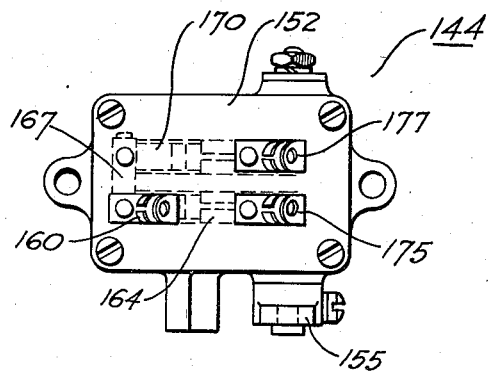
Figure 12 is a plan view disclosing details of the transmission operated switch mechanism of Figure 7.

As to the rail switch mechanism 144, which is disclosed in Figures 8, 9 and 11 in its transmission neutral position, the same includes a two part casing 152 having journalled therein a switch operating cam shaft 154; and said shaft is provided with an inclined flat 156 and an oppositely inclined flat 158. A crank 155 is secured to the end of the shaft 154 and said crank is connected to the shift rail operating crank 155 by a link 157. A switch terminal 160 receives a hot wire 162, Figure 7, and to this terminal there is electrically connected a movable switch member 164 of electrical conductive material and which is pivotally connected at 166 to a post 168 secured to the inner face of the casing. Another movable switch member 170, electrically connected, by a conductor 167, Figure 12, to the terminal 160 and positioned alongside the switch member 164, is pivotally connected to a post 169 extending inwardly from the casing; and to said movable switch members 164 and 170 there are secured switch contacts 172 and 179 respectively. Torsion springs 174 and 174' serve to bias the switch members 164 and 170 downwardly to move the aforementioned switch contacts 172 and 179 into engagement with fixed switch contacts 113 and 115 respectively and the latter contacts are mounted on electrically conductive supports 117 and 119 respectively said supports being secured to the switch casing. The contacts 113 and 115 are electrically connected, by the aforementioned support members, to terminals 175 and 177, respectively; and said terminals are electrically connected, by wires 173 and 171 respectively, to contacts 186 and 190 of the governor operated switch 146.

Describing the operation of the switch mechanism 144, when the transmission operating crank 55 is rotated clockwise by the power means to establish the transmission in its second gear setting the switch operating crank 155 is also moved in a clockwise direction, Figure 7; and this operation serves to rotate the cam shaft 154 counter-clockwise to open the switch 113, 172 said operation being effected as the second gear setting of the transmission is being completed. Now it is to be noted from an inspection of Figures 8 and 11 that when the switch mechanism 144 is in its transmission neutral position that both of the aforementioned switches of said mechanism are closed. The switches 113, 172 and 115, 179 are both closed except when the transmission is established in second gear or high gear; for an inspection of the electrical circuits of Figure 18 will reveal that to insure the heretofore described shuttling operation of the motor 78', particularly the vacuum energization of said motor to complete its operation of disengaging the clutch and resetting the transmission, it is necessary to maintain both switches 113, 172 and 115, 179 closed until either the high or second gear operation of the transmission is completed. When crank 55 is rotated clockwise to establish the transmission in its third gear setting, the setting of the two switches is reversed. the switch 115, 179 being opened and the companion switch remaining closed; and as with the above described operation of switch 113, 172 the opening of the switch 115, 179 is effected just as the high gear setting of the transmission is being completed.

Describing the governor operated switch mechanism 146, this mechanism includes a two part casing 180 housing a centrifugally operated governor mechanism 181 which is drivably connected to the propeller shaft of the vehicle or some other moving part of the power plant, the speed of which is directly proportional to the speed of the vehicle. A thrust member 182 of the centrifugal mechanism contacts the central portion of a movable switch contact member 184 which is biased into engagement with a fixed contact 186 by a spring 188. The parts of this switch mechanism are so constructed and arranged and so operative that when the vehicle is at a standstill or is travelling at or below a relatively low speed, for example 10 M. P. H., then the spring 188 serves to move the movable contact member 184 into engagement with the fixed contact 186; and when the vehicle is travelling above governor speed, say 13 M. P. H., then the centrifugally operated mechanism 181 is operative to force the contact 184 into engagement with a fixed contact member 190. Completing the description of the switch mechanism 146 the other end of the movable contact member 184 is electrically connected to a wire 185 which is connected to the solenoid 148.

Now the parts of the shift rail operated switch 144 are so operative and so cooperate with the governor operated switch 146 that an electrical circuit from the accelerator operated switch 142 to the solenoid 148 is completed when the transmission is established in either second gear or high gear and the governor is operated to close one of the two switches operated thereby; for it is to be remembered that the switches 113, 172 and 115, 179 are both closed except when the transmission is established in either second gear or high gear the switch 115, 179 being opened when the latter setting of the transmission is completed and the switch 113, 172 being opened when the second gear setting of the transmission is completed. In other words, just as the second gear setting of the transmission is being completed, one of the switches of the mechanism 144 is broken the other switch being at the time made to thereby prepare for a high gear operation of the mechanism of my invention; then when the speed of the vehicle goes above governor speed, the motor 78' is again energized to effect the high gear setting of the transmission. It is to be remembered, however, that the above discussed electrical circuits are completed to effect an energization of the motor 78' only when the accelerator is released to close the switch 142.

One of the most important features of the embodiment of my invention disclosed in Figure 7 lies in the means for insuring a closure of the engine throttle 57 as the motor 78' is operating to actuate the transmission and disengage the clutch, and for insuring the operation of the motor control electrical means to maintain said motor energized to effect said operations; for if such a mechanism were not provided, then a depression of the accelerator prior to a completion of said operations would, by virtue of the opening of the switch 142, prevent the completion of these operations of the accelerator would result in an undesirable racing of the engine while said operations were being effected.

Another feature of the mechanism of Figure 7 lies in the provision of means for synchronizing the opening of the throttle with the engagement of the clutch to effect the desired acceleration of the vehicle after the transmission has been operated to change its setting.

To effect the aforementioned control of the throttle there is incorporated in the mechanism of Figure 7 the above described force transmitting means interconnecting the throttle and accelerator and the two part stop means all of which is disclosed in Figure 1. The parts of the latter mechanism which duplicate like parts in the mechanism of Figure 1 are given the same reference numeral in Figure 7 with the addition of a prime.

Describing the operation of the throttle control mechanism of Figure 7 when the motor 78' is energized, as a result of a closure of the switches 142 and 146, the first increment of clutch disengaging movement of the piston 82 serves to rotate the cam 41' to a position beneath the arm R' of the lever 46'; accordingly there is provided, by this operation, means for preventing an opening of the throttle as the clutch is being disengaged and the transmission operated. With the return that is clutch engaging movement of the piston 82 the cam 41' rotates clockwise, Figure 7, and the parts of the mechanism are preferably so constructed and arranged and so operative that the cam portion indicated by the letter B' is opposite the end of the portion R' of the lever 46' when the clutch plates are just short of contact with each other. Up to this time, in the clockwise rotation of the cam 41', the sector B'C' of the cam 41', all points of which are equally distant from the center of the pivot 44', serves to make possible the idling operation of the throttle at say 1200 R. P. M. As the clutch plates move into contact the cam 41' continues to rotate clockwise and during this operation a sector B'A' of said cam serves to make possible a progressive opening of the throttle under the load of the force transmitting means 18', 20', 19' interconnecting the accelerator 200 and lever 46'. If the accelerator is depressed when the cam 41' is serving to prevent an opening of the throttle then this operation results in an expansion of the spring 20'; and said expanded spring later functions to open the throttle as just described.

There is thus provided means interconnecting the power element of a single acting motor 78', the accelerator, the clutch and the throttle, said means being operative to insure a closure of the throttle as said motor 78' is operating to disengage the clutch and change the setting of the transmission said means being also operative to effect the desired synchronization of the opening of the throttle and engagement of the clutch after said motor is deenergized and as the power element thereof is returning to its clutch engaged position.

As stated above the mechanism of Figure 7 includes means for insuring a completion of the clutch disengaging and transmission operating operation of the motor 78' once said operation is initiated and despite a depression of the accelerator to open the switch 142. To this end a switch 76' is mounted on the motor 78' said switch duplicating the above described switch 76 mounted on the motor 32 of the clutch control mechanism of Figure 1. As disclosed in Figures 7 and 18 the switch 76' is electrically connected in parallel with the accelerator operated switch 142 and the switch 76' is operated by the motor piston 82 in the same manner as is the switch 76 of the mechanism of Figure 1. There is thus provided electrical means operative to complete the electric circuit interconnecting the battery 138 and rail switch 144 immediately after the operation of the motor is initiated. Once the operation of the motor 78' is initiated the driver might, either inadvertently or by design, depress the accelerator and thereby open the switch 142 however the inclusion of the switch 76' in the mechanism insures an energization of the motor until the switch 144 is operative to break the electrical circuit thereby effecting a de-energization of said motor.

At this juncture it is to be noted that the transmission, throttle and clutch operating fluid motor 78' is disclosed as being vacuum operated; however, said motor may, if desired, be energized by any other suitable power medium. The three way valve 80 of said motor is preferably connected by a conduit 218 to the intake manifold of the internal combustion engine of the vehicle, said manifold providing a convenient source of vacuum when the engine is idling.

Describing now the complete operation of the mechanism of my invention disclosed in Figures 7 to 18 inclusive, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 26' to disengage the clutch and will then operate the shift lever 43 to manually effect said setting. The accelerator will then be depressed as the clutch is re-engaged to get the car under way; and after the desired car speed is reached, the shift lever and clutch pedal are again manually operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 43, which at the time is in its second gear setting, is rotated downwardly that is angularly in a clockwise direction in a plane perpendicular to the plane of the steering wheel; and this operation serves to bodily move the shaft 32 downwardly until a movable contact member 224, Figure 15, of the selector switch 47 is in contact with a fixed contact 226 of said switch to close the same. This operation constitutes a declutching operation the clutch mechanism 42', the clutch member 52' moving away from the clutch member 44' the movement of the latter being prevented by the stop 68'.

Figure 15:
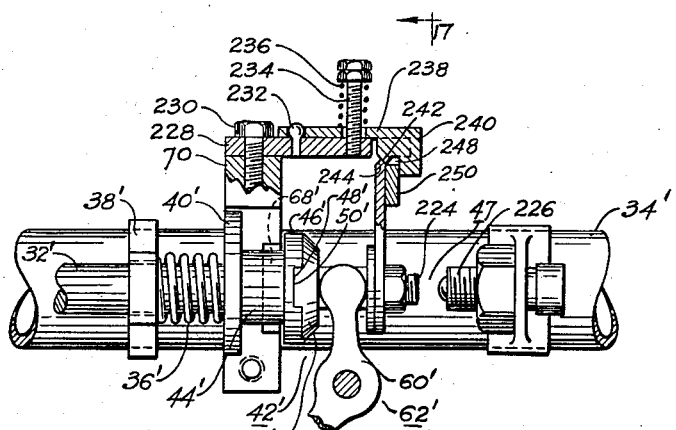
Figure 15 is an enlarged view of the mechanism at the base of the steering column of the mechanism of Figure 7 said mechanism serving to disconnect the shift lever from the power operated transmission operating linkage.
Figure 16:
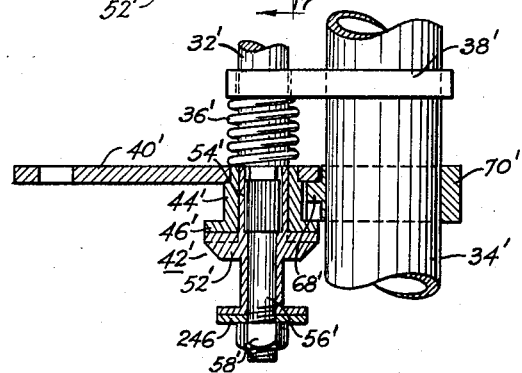
Figure 16 is a sectional view, taken on the line 16—16 of Figure 17, disclosing certain features of the mechanism disclosed in Figure 15.
Figure 17:
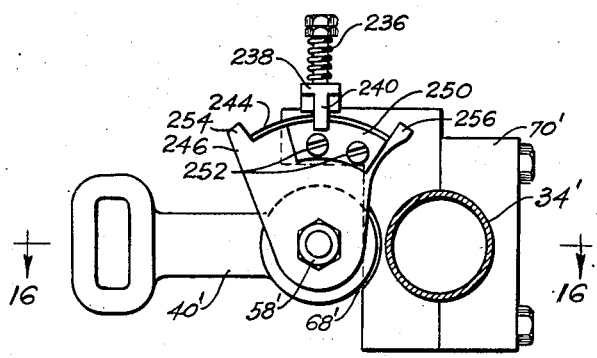
Figure 17 is a front view, taken on the line 17—17 of Figure 15, of the mechanism disclosed in Figure 15.

Referring to Figures 15 and 17 there is disclosed a latch mechanism for holding the shift lever in its automatic position, said mechanism including a relatively narrow rectangular shaped support member 228 preferably detachably secured to the bracket member 70' by a bolt 230; and there is mounted on said support member, by means of a guide pin 232, a bolt 234 and a spring 236, a movable latch member 238 shaped at its outer end to provide a relatively narrow stop member 240. Now when the shift lever 43 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 55, Figure 16, between the lower flange portion of the clutch member 52' and the nut 58'; and this operation serves to position said peripheral edge portion 244 in the space indicated by the reference numeral 248, Figure 15. Incidentally the shift rail selecting mechanism of the transmission and the cooperating transmission parts are so constructed that the crank 62' may be moved beyond its second and high shift rail selective position in effecting the above described automatic setting of the shift lever.

Now at this juncture it is to be noted, from an inspection of Figure 17, that a rectangular shaped stop member 250, secured to the outer face of the stop member 246 by screws 252, is in contact with the member 240 when the parts are in their transmission neutral position and when the spring 36' has operated to move the crank 53 to its second and high shift rail position, that is the position preparing the transmission for either second or high gear operation. It follows therefore that the stop member 246 must be rotated clockwise in Figure 17 so that the stop member 240 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 17 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Figure 10:
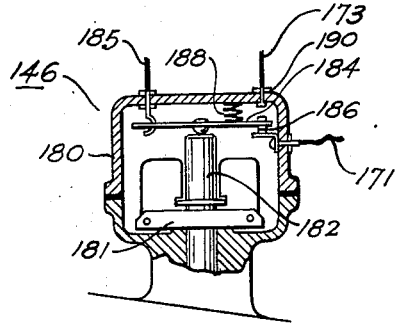
Figure 10 is a sectional view disclosing details of the governor operated switch of the mechanism of Figure 7.

Continuing the description of the operation of the mechanism the driver having moved the shift lever to its automatic position and assuming that the car is travelling above governor speed to close the switch 184, 190, Figure 10, the transmission will then be automatically established in its high gear setting after the driver releases the accelerator to close the switch 142; for with this operation an electrical circuit is completed via the grounded battery 138, the ignition switch 140, the then closed selector switch 47 the then closed accelerator operated switch 142, the switch 172, 113 of the rail switch 144, the switch 184, 190 of the governor operated switch 146 and the grounded solenoid 148. The resulting operation of the three way valve 80' effects an energization of the motor 78' the piston 82 of said motor being then subjected to a differential of pressures to move the same to the right, Figure 7. The left side of the piston 82 is at all times subjected to the pressure of the atmosphere via an opening 258 in one end of the motor and the right side of said piston, that is, the side constituting a wall of compartment 260, is subjected to a relatively low gaseous pressure when the three way valve 80' is opened to interconnect said compartment with the intake manifold or other source of vacuum. When the latter valve is closed, that is, when the solenoid 148 is de-energized, the compartment 260 is vented to the atmosphere through said valve and the spring 134 within said compartment is then operative to move the piston 82 to the left, Figure 1, to permit a re-engagement of the friction clutch, the preselecting operation of the alternator 86' and the operation of the cam 41' to control the operation of the throttle valve 57.

Describing the clutch disengaging and transmission operating operation of the motor 78 the above referred to rightward movement of the piston 82 serves to rotate the crank 24' to disengage the clutch; and as this operation is being effected the spring 94' is expanded inasmuch as the rod 88' cannot be moved to operate the transmission until after the driving torque is reversed, that is, until after the clutch is disengaged. Now immediately after the clutch plates are moved out of contact with each other to reverse the driving torque the above described force transmitting means interconnecting the rod 88' and crank 55 becomes operative to move said crank and establish the transmission in its high gear setting; and as this operation of the transmisison is being completed the rail switch 144 becomes operative to break the switch 172, 113. Now the breaking of the switch 172, 113 results in a de-energization of the solenoid 148 and as described above this results in a de-energization of the motor 78' to permit a re-engagement of the clutch and an opening of the throttle. At this juncture it is to be remembered that when the alternator 86' is operated in the operation of establishing the transmission in its high gear setting said alternator is at the same time operated to preselect a subsequent operation of the transmission to establish the same in its second gear setting; incidentally Figure 13 discloses the parts of the alternator in their high gear setting. It is also to be remembered that during this power operation of the mechanism in establishing the transmission in its high gear setting that an opening of the throttle valve 57 is prevented by the operation of the cam 41'.

The transmission will now remain in its high gear setting until the car is slowed down below governor speed and the accelerator is again released whereupon the motor 78' will again be energized to establish the transmission in its second gear setting and to operate the clutch and control the operation of the throttle to facilitate said transmission operation. If the car is then brought to a stop without neutralizing the transmission, that is leaving the shift lever in its automatic setting, the operation of the fluid coupling of the power plant will obviate a stalling of the engine despite the relatively high gear ratio setting of the transmission and despite the fact that the idling engine is at the time directly connected to the then stationary propeller shaft of the vehicle.

There is thus provided in the mechanism of Figure 7 a simple and effective manually and power operated mechanism for operating the transmission, clutch and throttle of an automotive vehicle; and the clutch pedal, the shift lever and the accelerator constitute the only manually operated controls of said mechanism. It is to be particularly noted that this mechanism includes but one pressure differential operated motor said motor being single acting and being operable, in one uninterrupted cycle of operations, to successively disengage the clutch, operate the transmission, and re-engage the clutch, the throttle being held closed, during the first two of said operations, by stop means operated by said motor and progressively opened, during the last of said operations, by cam means operated by said motor. With the embodiment of my invention disclosed in Figure 7 the driver may manually operate the clutch and the three speeds forward and reverse transmission in a conventional manner said operations being effected by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator. However, if the car becomes mired he probably will, after a manual disengagement of the clutch, operate the shift lever to establish the transmission in its low gear setting; and to reverse the direction of movement of the car the driver must, of course, first manually disengage the clutch and then operate the shift lever to establish the transmission in its reverse gear setting.

If a second gear setting of the transmission is desired when the transmission is established in its high gear setting and the shift lever is positioned in its automatic setting, then the driver will, after manually disengaging the clutch, first move the shift lever out of its automatic setting whereupon he will successively rotate the shift lever to its high gear position to mesh the clutch members 44 and 52 and then rotate said lever to its second gear position.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In an automotive vehicle provided with a friction clutch, a throttle, a change speed transmission and an accelerator; force transmitting means interconnecting the accelerator and throttle, power means, including a pressure differential operated motor, for operating the transmission and for disengaging and controlling the engagement of the clutch, means, including accelerator operated means, for controlling the operation of said motor, and stop means actuated by the force transmitting means and by the motor and operative to control the degree of opening of the throttle as the clutch is being engaged.

2. In an automotive vehicle having a power plant comprising a three speeds forward and reverse transmission, an engine controlling throttle and a friction clutch; power and manually operated means for operating the transmission and for operating the throttle and the clutch to facilitate the operation of the transmission, said means comprising manually actuatable means for effecting, by the physical effort of the driver, the low gear and reverse gear settings of the transmission, power actuated means serving when actuated to successively, in one cycle of operations, disengage the clutch and maintain the throttle closed during said operation, then effect one or the other of the second or high gear settings of the transmission, and then re-engage the clutch and concurrently control the opening of the throttle, pressure differential operated power means for actuating said power actuated means, and means for controlling the operation of the entire power and manually operated means including a manually operable shift lever serving as a control member to effect any one of the four settings of the transmission, a vehicle speed responsive governor for controlling the operation of the pressure differential operated power means, a manually operable clutch pedal for disengaging the clutch to facilitate the operation of effecting either the low gear or reverse gear settings of the transmission, and a manually operable throttle controlling member operable as a control member in effecting the second and high gear operations of the transmission.

3. Power and manually operated means for operating a three speeds forward and reverse change speed transmission of the power plant of an automotive vehicle and for operating the friction clutch and controlling the operation of the throttle of said plant to facilitate the operation of said transmission, said means comprising manually operable means serving, when actuated, to establish the transmission in either its low gear setting or its reverse gear setting, power actuated means serving, when actuated, to effect, in a cycle of operations, a disengagement of the clutch and a concurrent holding of the throttle closed, then either a second gear or high gear operation of the transmission, and lastly a re-engagement of the clutch and a concurrent progressive opening of the throttle as the clutch plates move into contact with each other, pressure differential operated means for actuating the power actuated means, and means for controlling the operation of the entire power and manually operated means comprising a gear shift lever, a shift lever operated breaker switch, a throttle controlling accelerator, and a breaker switch operated by the accelerator, the parts of the mechanism being so constructed and arranged and so operative that the cycle of operations of the clutch, throttle and transmission operating power means is initiated by releasing the accelerator to close the switch operated thereby and by moving the gear shift lever to a certain position to thereby close the switch operated by said lever.

4. In an automotive vehicle provided with a three speeds forward and reverse transmission, an engine controlling throttle and a friction clutch, power and manually operated means for operating said clutch and transmission including manually operated means for effecting either a reverse gear or a low gear setting of the transmission and for operating the clutch and throttle to facilitate said operations of the transmission, power operated means for successively effecting, in one cycle of operations, a disengagement of the clutch and a concurrent holding of the throttle in its closed position, then effecting either a second gear or high gear operation of the transmission, and lastly effecting a re-engagement of the clutch and a concurrent opening of the throttle as the plates of the clutch move into contact with each other, said power means including a pressure differential operated motor for operating the clutch, throttle and transmission, and means for controlling the operation of said power and manually operated means including a gear shift lever and a vehicle speed responsive governor.

5. In an automotive vehicle provided with a power plant including a three speeds forward and reverse transmission, an engine controlling throttle, a friction clutch, and a fluid coupling; power and manually operated means for operating the transmission and for operating the clutch and throttle to facilitate the operation of the transmission said means including manually operable means for effecting an operation of the throttle and either a low gear or a reverse gear operation of the transmission and also including a pressure differential operated motor operable to successively disengage the clutch and concurrently hold the throttle closed, then establish the transmission either in its second gear setting or its high gear setting and lastly re-engage the clutch and concurrently control the opening of the throttle the engagement of the clutch being facilitated by an operation of the fluid coupling, means for controlling the operation of said power and manually operated means including a gear shift lever operable as part of the controls for effecting any one of the four settings of the transmission and further including a vehicle speed responsive governor for in part controlling the operation of the pressure differential operated motor.

6. In an automotive vehicle provided with an engine controlling throttle, an accelerator, a friction clutch and a change speed transmission; force transmitting means, including a yieldable member, interconnecting a throttle and accelerator, means for operating the transmission including means for alternately establishing the same in two different settings and for operating the clutch and controlling the operation of the throttle to facilitate said operations of the transmission, said latter means including motor operated cam means for controlling the operation of the force transmitting means in its throttle operating operation, a motor operably connected to the clutch, the transmission and the cam means and operative, in one cycle of operations, to successively disengage the clutch and concurrently operate the cam means as a stop to hold the throttle closed, then operate the transmission to establish the same in a new setting, and lastly re-engage the clutch and concurrently operate the cam means to control the mode of throttle opening movement of the force transmitting means, and means for controlling the operation of said motor.

7. In an automotive vehicle including a power plant comprising an internal combustion engine, a vehicle speed responsive governor, an engine controlling throttle, a throttle operating accelerator, a propeller shaft and power transmitting mechanism interconnecting the engine and propeller shaft; means for controlling the operation of the power transmitting mechanism and for controlling the operation of the throttle including a single acting pressure differential operated motor operably connected to a part of said power transmitting mechanism and to the throttle, said motor including a power element and a spring for returning said power element to its inactive position, valve means for controlling the operation of said motor, electrical means, including a solenoid, for controlling the operation of said valve means, said electrical means including a switch mechanism actuated by said governor, an accelerator operated switch which is closed when the accelerator is completely released and opened when the accelerator is slightly depressed, and switch mechanism operative, when the accelerator is depressed and just as the power element of the motor is completing its power operation, to break the then existing electrical connection with the solenoid and thereby initiate an operation of the valve means to effect a de-energization of the motor, throttle operating force transmitting means interconnecting the accelerator and throttle, and throttle controlling means, including a cam member, connected with the power element of the motor, said motor and throttle controlling means serving, when the accelerator is depressed immediately after the operation of the motor is initiated and before said motor has completed its power operation, to successively effect, in a cycle of operations, an operation of the aforementioned part of the power transmitting mechanism the throttle being held closed during said operation and then effect a control of the opening of the throttle as the power element is returning to its inactive position under the load of the motor spring.

8. In a motor vehicle having a clutch, a transmission and an engine, a control mechanism for said transmission and clutch comprising a pressure differential operated motor and means operably connecting said motor with said transmission and said clutch and adapted to disengage said clutch, change the speed ratio drive in said transmission and re-engage said clutch as an incident to actuation of said motor, driver controlled means to control the actuation of said motor and means responsive to actuation of said motor to prevent driver interference with the actuation thereof once said driver controlled means has initiated actuation of said motor.

9. In a motor vehicle having a clutch, a transmission and an engine, a control mechanism for said transmission and clutch comprising a pressure differential operated motor and means operably connecting said motor with said transmission and said clutch and adapted to create a cycle of events which effect a change in speed ratio drive of said vehicle by said engine in response to actuation of said motor, said events including a disengagement of said clutch, a change in the speed ratio drive in said transmission and a re-engagement of said clutch, driver controlled means to control the actuation of said motor and means responsive to actuation of said motor to assure the completion of said cycle regardless of driver manipulation of said driver controlled means once the cycle has been initiated by said driver controlled means.

10. In a motor vehicle having a clutch and transmission and an engine provided with a throttle adapted to be actuated by an accelerator pedal, a control mechanism for said transmission and clutch comprising a pressure differential operated motor, means providing a fluid flow connection between said motor and a source of vacuum, a valve in said connection operable to selectively connect said motor to said source of vacuum and to atmosphere, solenoid means to control the operation of said valve, an electric circuit including a first switch and a vehicle speed responsive switch and operable to selectively energize and deenergize said solenoid in response to opening and closing of said switches and a mechanical connection between said throttle and said first switch operable to close said first switch in response to substantial closing of said throttle and when said vehicle speed responsive switch is also closed to thereby induce actuation of said motor, means operably connecting said motor with said transmission and clutch and adapted to disengage said clutch, change the transmission speed ratio drive and re-engage said clutch as an incident to actuation of said motor, and means responsive to actuation of said motor to hold said throttle in a substantially closed position irrespective of movement of said accelerator pedal until said motor actuation is completed whereby the completion of the motor actuation is assured once it is initiated regardless of later driver manipulation of the accelerator pedal.

EARL R. PRICE.

REFERENCES CITED

The following references are of record in the file of this patent:

UNITED STATES PATENTS

| Number | Name | Date |
|---|---|---|
| 1,818,910 | Sanine | Aug. 11, 1931 |
| 1,893,644 | Fleischel | Jan. 10, 1933 |
| 1,911,599 | Bloxson | May 30, 1933 |
| 2,062,104 | Prince | Nov. 24, 1936 |
| 2,067,848 | Hnizdo et al. | Jan. 12, 1937 |
| 2,252,009 | Kenny | Aug. 12, 1941 |